United States Patent
Yamanis et al.

(10) Patent No.: US 7,144,649 B2
(45) Date of Patent: Dec. 5, 2006

(54) INTERCONNECT FOR SOLID OXIDE FUEL CELLS

(75) Inventors: Jean Yamanis, S. Glastonbury, CT (US); Sunil G. Warrier, Middletown, CT (US); Venkata R. Vedula, Middletown, CT (US); Raymond C. Benn, Madison, CT (US); John G. Smeggil, Simsbury, CT (US); Shihong G. Song, South Windsor, CT (US); Wayde R. Schmidt, Pomfret Center, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 400 days.

(21) Appl. No.: 10/307,008

(22) Filed: Nov. 27, 2002

(65) Prior Publication Data

US 2004/0101733 A1    May 27, 2004

(51) Int. Cl.
  *H01M 2/00* (2006.01)
  *H01M 8/00* (2006.01)
(52) U.S. Cl. .......................... 429/34; 429/12
(58) Field of Classification Search ................ 429/34, 429/44
  See application file for complete search history.

(56) References Cited

U.S. PATENT DOCUMENTS

| | | | |
|---|---|---|---|
| 4,721,556 A | 1/1988 | Hsu | 204/258 |
| 4,997,727 A * | 3/1991 | Bossel | 429/33 |
| 5,034,288 A * | 7/1991 | Bossel | 429/32 |
| 5,064,734 A | 11/1991 | Nazmy | 429/33 |
| 5,069,987 A | 12/1991 | Gordon | 429/31 |
| 5,273,837 A * | 12/1993 | Aitken et al. | 429/30 |
| 5,424,144 A | 6/1995 | Woods, Jr. | 429/35 |
| 5,496,655 A | 3/1996 | Lessing | 429/34 |
| 5,549,983 A | 8/1996 | Yamanis | 429/32 |
| 5,733,682 A | 3/1998 | Quadakkers et al. | 429/210 |
| 6,054,231 A | 4/2000 | Virkar et al. | 429/34 |
| 6,291,089 B1 | 9/2001 | Piascik et al. | 429/17 |

FOREIGN PATENT DOCUMENTS

| | | | |
|---|---|---|---|
| EP | 0397072 | | 5/1990 |
| EP | 0410159 | * | 6/1990 |
| EP | 0410166 | | 7/1990 |
| EP | 0418528 | | 8/1990 |
| EP | 0432381 | * | 9/1990 |
| EP | 0424691 | | 10/1990 |
| EP | 0424732 | | 10/1990 |
| EP | 0440968 | | 12/1990 |
| EP | 0950431 | | 4/1999 |

(Continued)

*Primary Examiner*—Patrick Joseph Ryan
*Assistant Examiner*—Thomas H. Parsons
(74) *Attorney, Agent, or Firm*—Bachman & LaPointe, P.C.

(57) ABSTRACT

A fuel cell stack includes a plurality of fuel cells each having an anode layer, an electrolyte layer, and a cathode layer, the fuel cells each having a first effective thermal expansion coefficient; a plurality of bipolar plates positioned between adjacent fuel cells having an anode interconnect, a separator plate, and a cathode interconnect, the bipolar plates being positioned between adjacent fuel cells, wherein the anode interconnect is in electrical communication with the anode layer of one adjacent fuel cell, wherein the cathode interconnect is in electrical communication with the cathode layer of another adjacent fuel cell, and wherein at least one interconnect of the cathode interconnect and the anode interconnect has a second thermal expansion coefficient and is adapted to reduce strain between the at least one interconnect and an adjacent fuel cell due to differences between the first and second thermal expansion coefficients over repeated thermal cycles.

36 Claims, 5 Drawing Sheets

FOREIGN PATENT DOCUMENTS

| | | |
|---|---|---|
| JP | 10-92446 | 4/1989 |
| JP | 3-184268 | * 10/1990 |
| JP | 3-155046 | 7/1991 |
| JP | 10-106597 | 4/1998 |
| JP | 10-199555 | 7/1998 |
| JP | 11-162498 | 6/1999 |

* cited by examiner

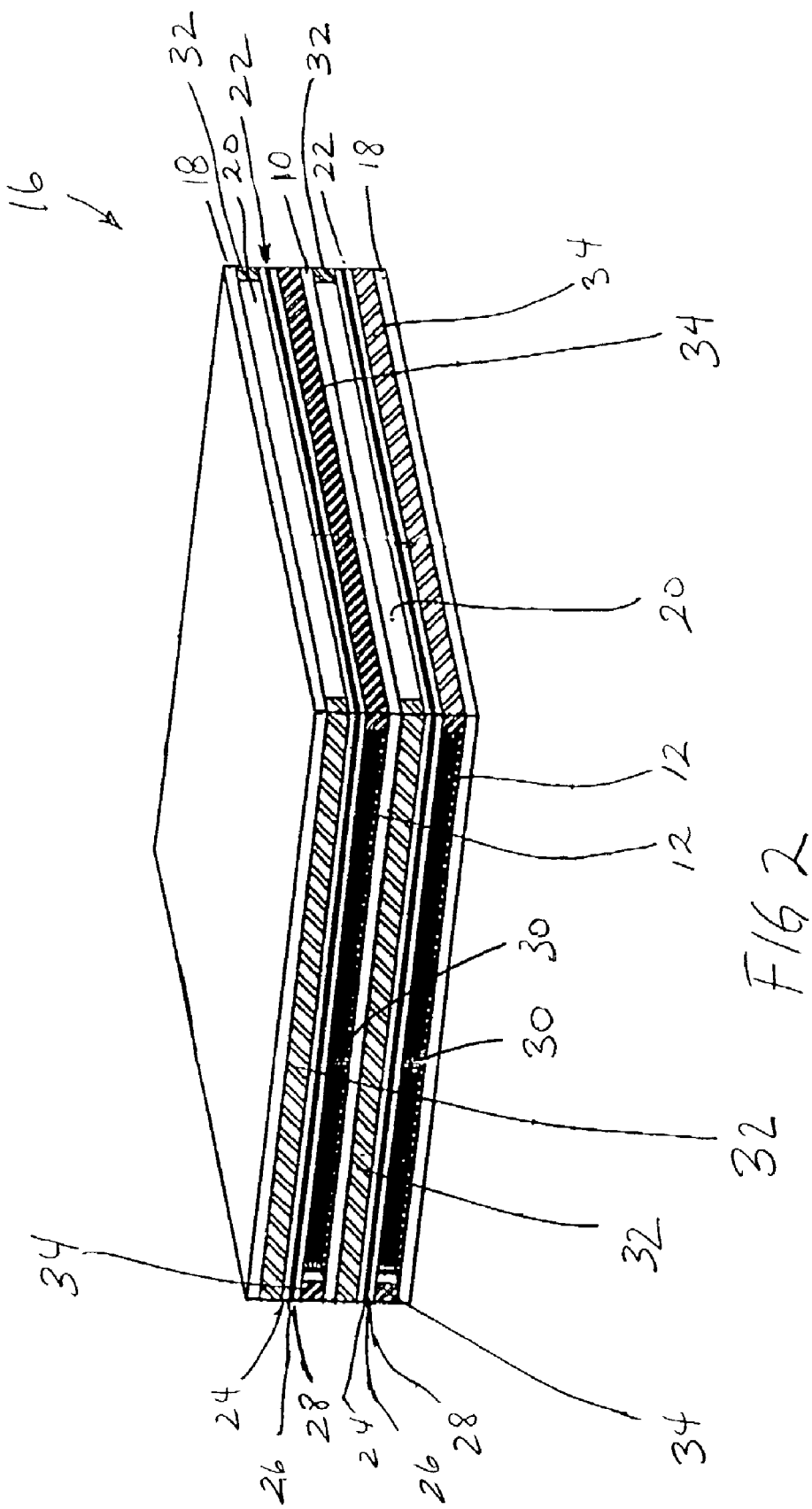

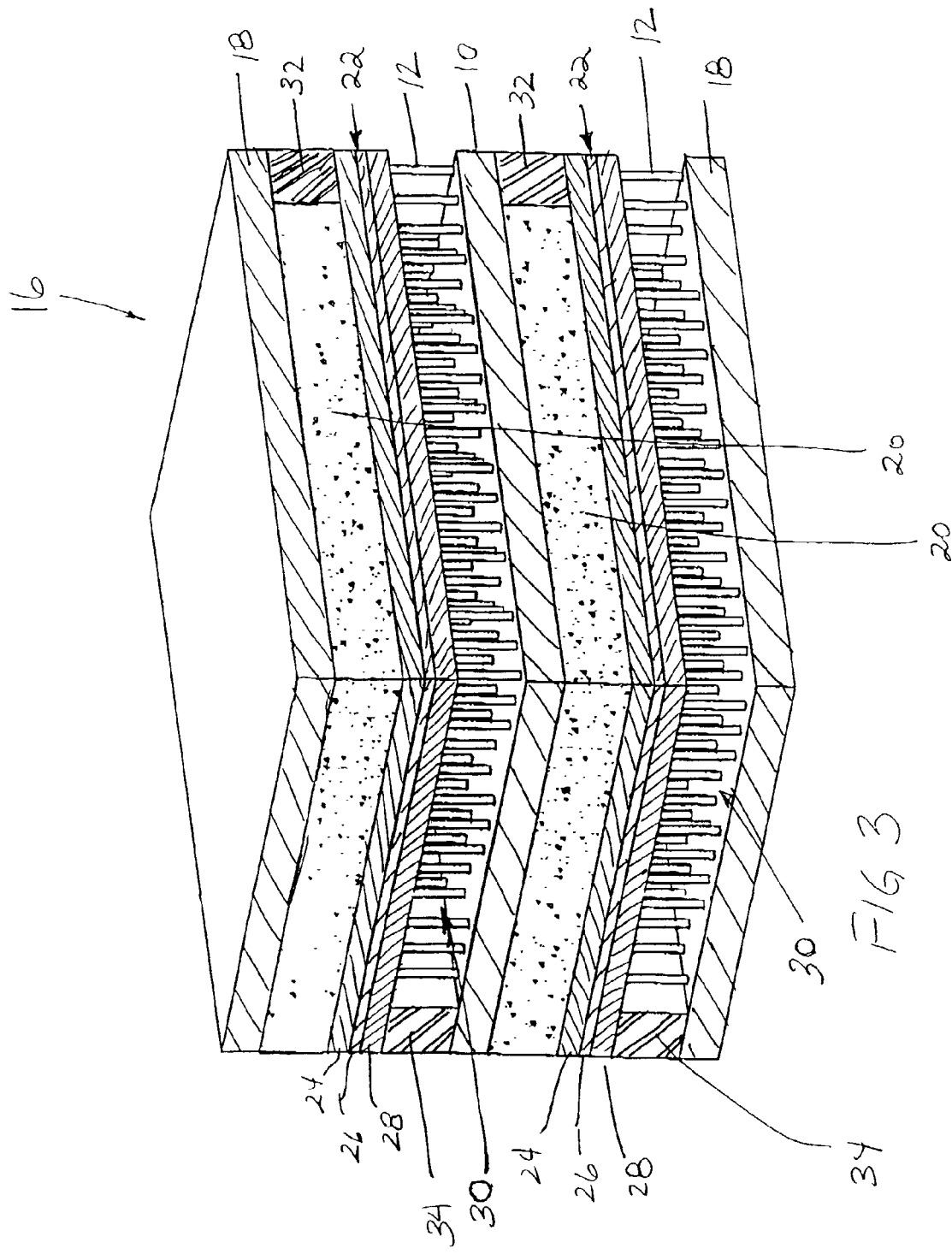

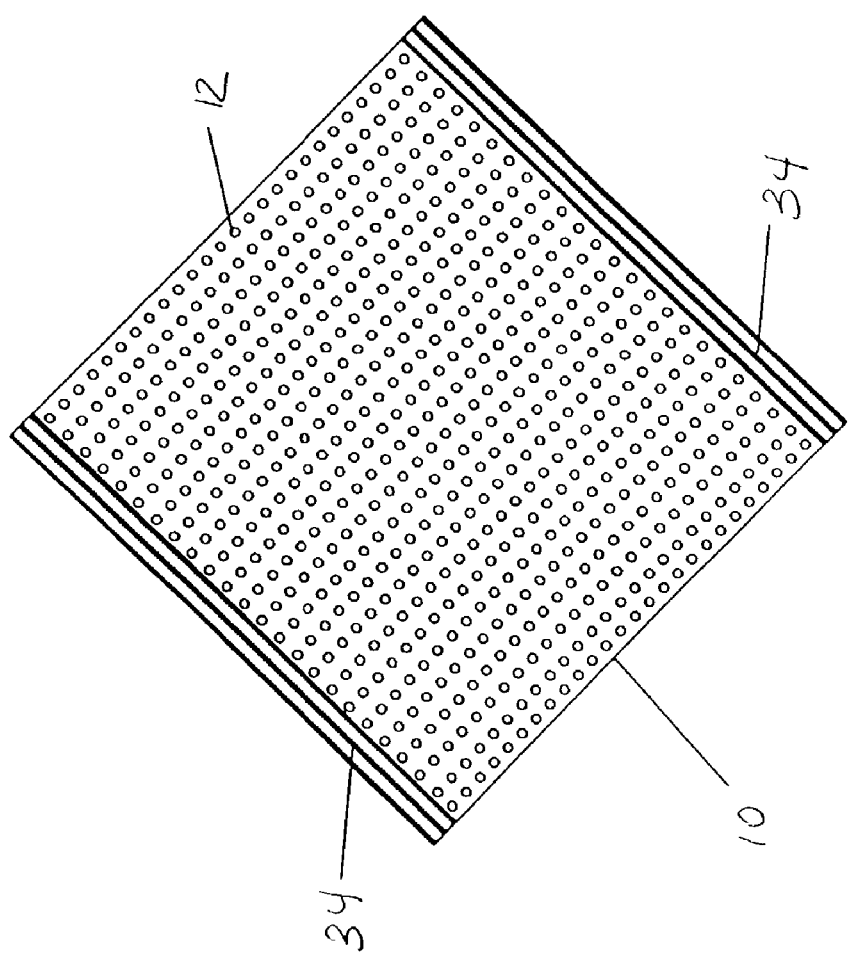

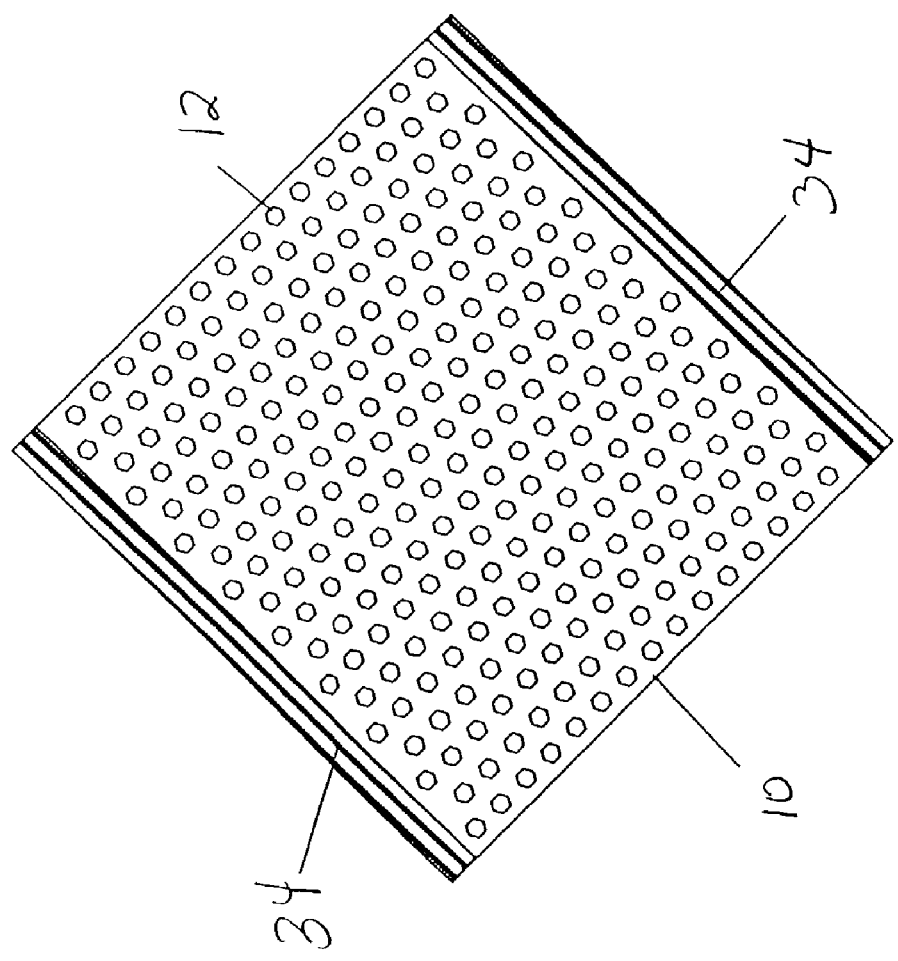

INTERCONNECT FOR SOLID OXIDE FUEL CELLS

BACKGROUND OF THE INVENTION

The invention relates to solid oxide fuel cell (SOFC) stacks and, more particularly, to an interconnect structure that enhances the lifetime of SOFC stacks.

A fuel cell is a device which electrochemically reacts a fuel with an oxidant to generate a direct current. The fuel cell typically includes a cathode, an electrolyte and an anode, with the electrolyte being a non-porous material positioned between the cathode and anode materials. In order to achieve desired voltage levels, such fuel cells are typically connected together using interconnects or bipolar plates to form a stack, or fuel cell stack, through which fuel and oxidant fluids are passed. Electrochemical conversion occurs, with the fuel being electrochemically reacted with the oxidant, to produce a DC electrical output.

The basic and most important requirements for the interconnect materials on the cathode side of a SOFC stack are sufficient oxidation and corrosion resistance in air at the stack operating temperatures; sufficient electron conductance; and close matching of thermal expansion behavior to that of the ceramic cell. In the case of metallic interconnects, the requirement of sufficient electron conductance is essentially equivalent to the electron conductance of the oxide scale that forms on the metal surface because the oxide scale tends to be the limiting resistance. Currently, the lack of stable, long-life (>40,000 hours), metallic interconnects for the cathode side of the stack, is a serious weakness of planar solid oxide fuel cells, because existing metal alloys cannot meet the thermal expansion, oxidation resistance, and electron conductance requirements simultaneously.

Cathode interconnect materials that have been used to date include perovskite-based ceramics, e.g. lanthanum chromite, high temperature chromium-based alloys or composites thereof, and nickel-based alloys or intermetallics have been used typically for cells operating in the 800–1000° C. range.

The prior art on ceramic-based interconnects such as lanthanum chromite indicates that this material exhibits both usable high temperature conductivity and thermal expansion behavior that matches the cell. However the ceramic is very expensive, has low toughness and is difficult to manufacture as a suitable interconnector. Chromium-based interconnector materials have similar drawbacks.

Lower operating temperatures, (650–800° C.) with planar anode-supported (ASE) cells, permit lower cost materials such as ferritic stainless steels that have a better coefficient of thermal expansion (CTE) match with the cell than Ni-based alloys. Commercial grades of ferritic steels may have suitable oxidation resistance at temperatures less than about 600° C. or for short lifetimes, but do not have the required oxidation resistance to last for 40,000 hours, or longer, due to the increasing ohmic resistance across the oxide scale with time under load.

The majority of prior art on these issues has attempted to prevent or ameliorate the degradation caused by oxide scale. Specifically, to take advantage of the lower cost and favorable CTE of ferritic steels, minor alloying additions and/or surface coatings have been researched to improve the oxidation resistance and conductivity. Certain elements such as Mn, appear beneficial in forming manganese chromite which increases the conductivity of the oxide scale, but more data are needed to determine whether both conductivity and oxidation resistance are sufficient for long-term applications.

However, elements known to improve oxidation resistance, such as Al and Si, also tend to reduce the oxide conductivity and increase the CTE of the alloy. In Fe—Cr—Al—Y type steels, excellent oxidation performance is traded for the high resistivity of the alumina film. Hence, the current state-of-the-art with regard to low cost Fe—Cr-based steels, has not fully resolved the long-term contact and oxidation issues.

Other materials, such as Ni—Cr or Ni—Cr—Fe-based alloys, while having good oxidation/corrosion resistance by design, typically have CTE values in the 15–18 parts per million (ppm)/° C. compared to the 10–12 ppm/° C. of ferritic steels which better match the CTE of the ceramic cell.

Preferential removal of the oxide and/or coating/doping of the alloy surface with noble metals such as Ag, Au, Pt, Pd, and Rh has been used to mitigate conductivity loss by reducing oxygen diffusion into the contact points of the interconnect, but noble metals are too costly to use in power plants and commercial applications.

The oxidation resistance is clearly a concern on the cathode/oxidant side of the interconnect. However, the partial pressure of oxygen at the anode/fuel electrode may also be high enough to form $Cr_2O_3$ and the oxide may be even thicker (viz. the presence of electrochemically formed water) than on the cathode side of the interconnect, so the resistivity of the interconnect may increase on both sides. The construction materials on the anode side of the interconnect could be the same as the cathode, although prior art has shown that, in the case of a ferritic steel interconnect in contact with a nickel anodic contact, weld points that formed between the steel and the nickel still formed a thin electrically insulating $Cr_2O_3$ layer over time which degraded performance.

It is clear, from the above review of background art, that the need remains for a substantially improved interconnect between adjacent cells, whereby interface strains, caused by CTE mismatch during thermal cycling, are substantially eliminated, while the material provides long-term oxidation resistance and high electron conductance across the oxide scale. It is therefore the primary object of the present invention to provide an interconnect or bipolar plate that meets the aforementioned needs.

Other objects and advantages of the present invention will appear hereinbelow.

SUMMARY OF THE INVENTION

In accordance with the present invention, the foregoing objects and advantages have been readily attained.

The present invention provides a solid oxide fuel cell stack design that decouples the requirements of oxidation resistance, oxide scale electron conductance, and close coefficient of thermal expansion match with other stack components. This decoupling of requirements widens the range of metallic materials that can be used for the interconnect, especially on the cathode side, and enables the use of metallic materials that can provide lifetimes in excess of 40,000 hours.

According to the invention, a fuel cell assembly is provided which comprises a plurality of fuel cells each having an anode layer, an electrolyte layer, and a cathode layer, the fuel cells each having a first effective thermal expansion coefficient; a plurality of bipolar plates positioned between adjacent fuel cells having an anode interconnect, a separator plate, and a cathode interconnect, said bipolar plates being positioned between adjacent fuel cells, wherein said anode interconnect is in electrical communication with said anode layer of one adjacent fuel cell, wherein said cathode interconnect is in electrical communication with said cathode layer of another adjacent fuel cell, and wherein at least one interconnect of said cathode interconnect and said anode interconnect has a second thermal expansion coefficient and is adapted to reduce strain between said at least one interconnect and an adjacent fuel cell due to differences between said first and second thermal expansion coefficients over repeated thermal cycles.

The means for electrically connecting can advantageously be a plurality of wires adapted to electrically communicate the first and second fuel cell components without transmitting stresses due to thermal expansion differences between the components. Alternatively, the interconnect can be a foam, felt or wire mesh configuration.

BRIEF DESCRIPTION OF THE DRAWINGS

A detailed description of preferred embodiments of the present invention follows, with reference to the attached drawings, wherein:

FIG. 2 schematically illustrates a two cell stack having interconnect structure in accordance with the present invention on the cathode side;

FIG. 3 is a cross section through the stack of FIG. 2;

FIG. 4 is a cross section through the cathode side interconnect of a stack according to the invention showing wires of round cross section in a square arrangement; and FIG. 5 is a cross-section through the cathode side interconnect of a stack according to an alternative embodiment of the invention, showing wires of hexagonal cross-section in a staggered layout.

DETAILED DESCRIPTION

Figure 1:
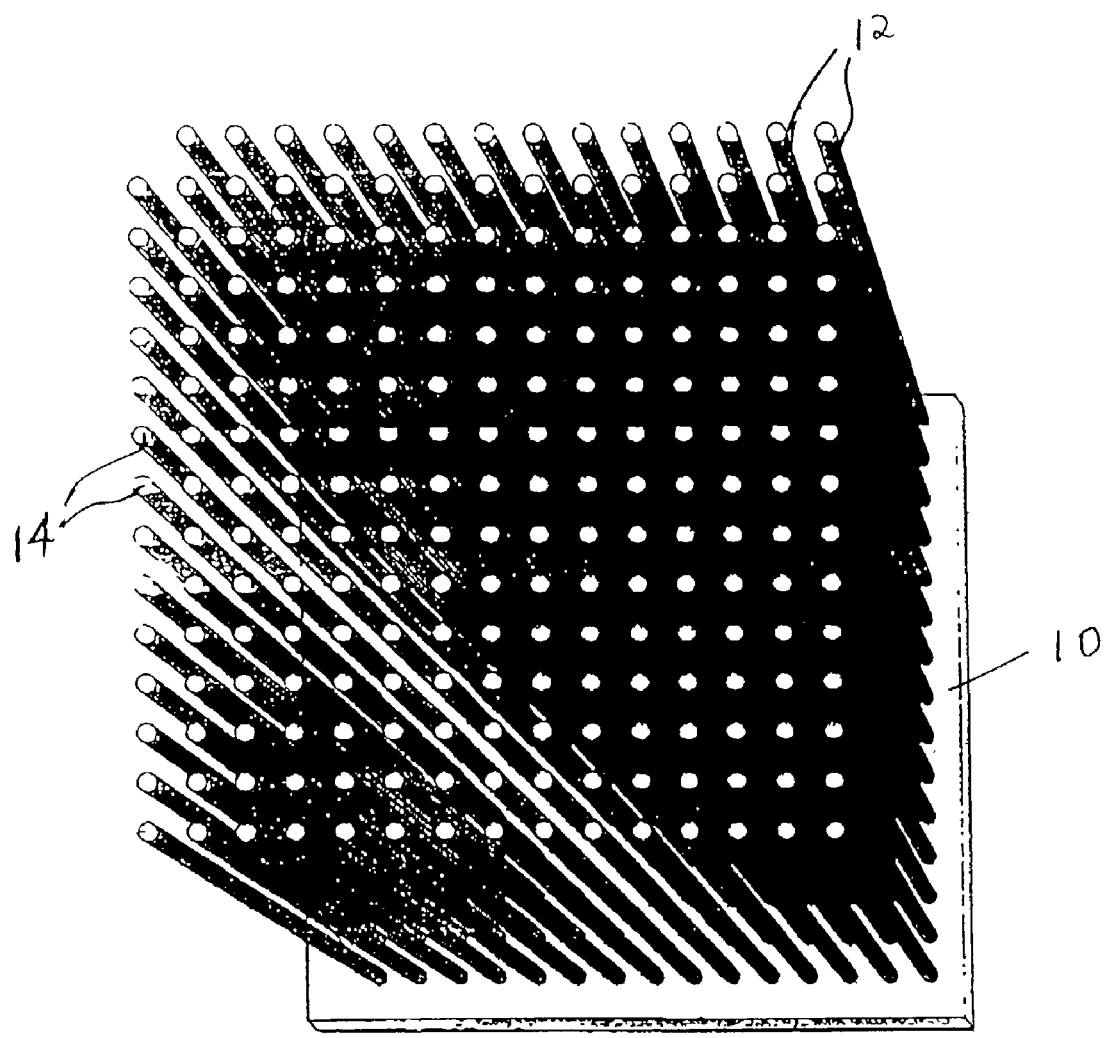
FIG. 1 schematically illustrates an interconnect having a plurality of wires bonded to a separator plate in accordance with the present invention.

The invention relates to a fuel cell assembly and, more particularly, to a solid oxide fuel cell (SOFC) stack having improved metallic interconnect which decouples the need for good coefficient of thermal expansion (CTE) match with other stack components from other requirements such as oxidation resistance and oxide scale electron conductance.

The metallic interconnect or bipolar plate in a planar solid oxide fuel cell has to perform three main functions. First, the material should provide sufficient oxidation resistance for long times (>40,000 hours) at use temperatures of 650° C. and above. Secondly, the oxide scale formed on the material at high temperatures should be electrically conducting. And thirdly, the material should have comparable thermal strains with the other stack components. The state of the art in metallic interconnect materials are ferritic and super-ferritic stainless steels which are chosen mainly due to the third requirement listed above, i.e., close match of thermal strains with other stack components or, in other words, similar coefficients of thermal expansion (CTE). However, the ferritic and super-ferritic stainless steels do not have sufficient oxidation resistance to last tens of thousand of hours at temperatures above 650° C. The materials that have good oxidation resistance for this application, such as Ni—Cr or Ni—Cr—Fe alloys, typically have much higher CTE's (15–18 ppm/° C.) than the other stack components (10–12 ppm/° C.). Therefore, there is a need for improved interconnect materials and/or innovative design approaches.

The invention relates to a fuel cell stack and more particularly to a solid oxide fuel cell stack having improved interconnects, whereby stresses due to difference in thermal expansion coefficients between adjacent fuel cell stack components, specifically between the cathode or anode interconnect and adjacent fuel cell or separator plate, are minimized so as to provide for enhanced fuel cell stack lifetime and robustness under steady state and thermal cycling.

Planar solid oxide fuel cells may be subjected to high magnitude thermal and mechanical stresses depending on the properties of various materials, stack design, and operating conditions. In order to ensure long lifetime without appreciable performance loss, it is critical to maintain the structural integrity of the stack throughout the operating range of the fuel cell.

Solid oxide fuel cell stacks are usually assembled at ambient temperatures and fired at high temperatures to bond and seal into modular units. At the firing temperature, all layers are in mechanical and thermal equilibrium; that is, the stack assembly is stress-free. As the stack is cooled down to room temperature, different components will attempt to strain differently, developing stresses and residual strains in the various regions of the stack. The strains and stresses in the stack will change when the fuel cell stack is heated to operating temperature.

The expansion and contraction as a function of temperature is governed by the coefficient of thermal expansion (CTE) of the materials that form the stack. The over-all expansion and contraction of the stack is governed by the individual CTE's of different components, such as the separator plate, the interconnects, and the cell, which is made up of three different layers, the anode, electrolyte, and the cathode. The dimensions (mainly thickness) and stiffness of the individual layers also play an important role in controlling the stress state in each layer. The differential thermal residual strains in the individual layers can be large enough to cause layer cracking resulting in stack failure. The large residual thermal strains at the interfaces between various layers can result in crack initiation and propagation, fatigue, and/or creep mechanisms eventually leading to premature bond failure. The high stresses and strains can also enhance other chemical and microstructural degradation mechanisms such as elemental segregation and corrosion. The effects are further enhanced by the temperature gradients in the stack during operation, especially in cross-flow configuration of air and fuel on cathode and anode side respectively. In addition, the stresses are higher during the transient heating and shutdown of fuel cell because the density, heat capacity, and thermal conductivity, which govern the rate of temperature change, of different components are widely different. The effect is exacerbated in the presence of mechanical loads on the stack assembly. Therefore, there is a strong need to at least reduce thermal stresses that arise from CTE mismatch between different stack components by choosing materials that have similar expansion behavior.

The electrolyte material in an SOFC is typically dense yttria stabilized zirconia (YSZ) with a nominal CTE of between about 10 and 11 ppm/° C. depending on composition. The anode is typically nickel-YSZ cermet and the cathode is typically strontium-doped lanthanum manganite (LSM) or variations thereof. The effective CTE of the ceramic trilayer (cathode, electrolyte, and anode) cell is nominally 11–12 ppm/° C. and the effective CTE of the other components, separator plate and interconnects, should conventionally closely match this value to reduce the thermal stress in the SOFC stack. However, very few metallic alloys have coefficients of thermal expansion (CTE) that closely match the CTE of trilayer cell. These materials are ferritic and super-ferritic stainless steels, and in particular E-BRITE®, an Allegheny-Rodney product. This material, or variations thereof, is an ideal candidate for the separator plate as it is stable in both oxidizing and reducing environments. However, this material does not have sufficient oxidation resistance for the cathode side interconnects. Ferritic and super-ferritic stainless steels form chromium oxide, $Cr_2O_3$, or chromia, scale in oxidizing conditions. The chromia scale is a semiconductor and presents electronic resistance at the SOFC operating conditions, the resistance being proportional to the thickness of the oxide scale. The growth kinetics of chromia scale follow a parabolic law and scale thickness continuously increases as a function of time at the operating temperature. As a result the ohmic resistance of the stack keeps increasing and the stack power output keeps degrading at a rate that limits the stack lifetime. Therefore these materials do not have sufficient oxidation resistance to ensure the required stack lifetime of more than 40,000 hours for stationary applications.

The materials that have good oxidation resistance for this application, such as chromia-forming Ni—Cr or Ni—Cr—Fe alloys, typically have much higher CTE's (15–18 ppm/° C.) than the other stack components. When these materials with high temperature oxidation resistance and electronically conducting scales are bonded to the cathode electrode for minimization of the interface resistance, the CTE mismatch gives rise to large stresses during thermal cycling which fracture the individual layers or the interface bond and eventually lead to failure of the stack. These thermal stresses due to the CTE mismatch are a function of the bonded area between the two components and the overall length and cross-section gauge of the metallic material.

The present invention substantially eliminates the detrimental effect of the CTE mismatch discussed herein by minimizing the footprint of the metallic interconnect member that is bonded to the SOFC electrode. Minimization of the bonded footprint is achieved by means of discrete segments such as wires that are bonded to or otherwise electronically communicated with the electrode over their cross-sectional area. Further, bonding of separator wires to the electrode serves to segment the bonded area into smaller sub-bonded elements which can move relative to each other with the adjacent electrode, thereby significantly reducing strain between the interconnect and the electrode due to CTE mismatch.

FIG. 1 schematically illustrates a separator plate 10 having disposed thereon a plurality of wires 12. Wires 12 are preferably bonded to separator plate 10 using a suitable process such as brazing, welding or the like, and opposite ends 14 of wires 12 are bonded to an electrode of a solid oxide fuel cell during stack fabrication. Wires 12 are referred to herein as a cathode interconnect.

The interconnect structure of the present invention can be applied to the air-side or cathode-side and to the fuel-side or anode-side of the cell, but application to the air-side as a cathode interconnect is a particularly important use since wires of suitable diameter enable the use of any metallic alloy with sufficient oxidation resistance and oxide scale electron conductance irrespective of its thermal expansion coefficient. Thus, the interconnect structure of the present invention decouples one of the three requirements, thermal expansion coefficient, from the other two requirements, i.e., oxidation resistance and oxide scale electron conductance.

In accordance with one embodiment of the present invention, cathode interconnect 12 is provided in the form of a plurality of wires extending between surfaces of the separator plate 10 and electrode, and bonded, brazed or otherwise secured thereto.

Reducing the size of the "footprint" of the wires, and the overall dimensions of the metallic element, to the diameter of a thin wire, electrically communicates the various stack components without transmitting stresses due to thermal expansion differences between the components.

In this embodiment, the interconnect is provided in the form of a wire-brush, i.e., a thin, flat plate with short stubs of wire bonded to the plate, and this structure will be referred to as a wire-brush interconnect. In this design, the footprint that is bonded to the cathode electrode corresponds to the cross section of the wire. Residual stress calculations based on simplified models show that the stresses are a function of the wire diameter, where the stress increases with increase in wire diameter or contact area. The spacing of the wires is dictated by electrical resistance calculations to provide minimal overall interface resistance. This structure would be quite porous and provide little resistance to gas flow as desired.

FIG. 2 shows a fuel cell stack 16 which includes a series of substantially planar fuel cell components including end plates or current collectors 18, anode interconnect 20 in accordance with the present invention, fuel cell 22 which includes an anode 24, an electrolyte 26 and a cathode 28, and a cathode interconnect 30, in this embodiment in the form of wires 12. A separator plate 10 is positioned adjacent to cathode interconnect 30, followed by a repeated fuel cell including anode interconnect 20, fuel cell 22 including anode 24, electrolyte 26 and cathode 28, cathode current collector 30 and end plate 18.

In operation, fuel and air are passed through anode interconnect 20 and cathode interconnect 30, typically at right angle flow directions, also known as cross-flow, from one side of the stack to the other. Sides of a layer which are parallel to the direction of flow typically have a sealant, which is shown for anode interconnect 20 as sealant 32, and which is shown for cathode interconnect 30 as sealant 34.

FIG. 2 illustrates a stack in accordance with the present invention which includes two fuel cells 22. It should of course be appreciated that a typical fuel cell stack 16 may include many more fuel cells as are desired in connection with a particular application, and that a stack containing more fuel cells would have various fuel cell planar members assembled in repeating pattern such as are illustrated in FIG. 2, between two end plates 18.

FIG. 3 shows an enlarged portion in a cross sectional view of fuel cell stack 16 of FIG. 2. FIG. 3 illustrates cathode interconnect 30, on the cathode side, and is provided as a plurality of wires 12. FIG. 3 further illustrates an embodiment of an interconnect in accordance with the present invention, in this case in connection with interconnect 20 on the anode side, which is provided as a foam material, rather than wires. In the anode interconnect environment, the interconnect can advantageously be provided as a nickel foam or mesh, which is particularly desirable on the anode or fuel side of the fuel cell assembly in accordance with the present invention.

Turning now to FIG. 4, a top cross section is provided through a wire interconnect such as interconnect 30 of FIGS. 2 and 3, and shows wires 12 having a substantially round cross section and positioned in a substantially square configuration with aligned rows and columns. FIG. 4 also shows separator plate 10 on which wires 12 are bonded, as well as seal members 34 running along two sides of the device.

The assembly including a separator plate 10 along with a cathode interconnect and anode interconnect positioned on opposite-facing sides is referred to herein as a bipolar plate and is a subassembly of a fuel cell stack which is particularly useful in assembling fuel cell stacks in accordance with the present invention. Such a bipolar plate or assembly is advantageously positioned between fuel cells, with the anode interconnect electrically communicated with an adjacent anode of a fuel cell, and with the cathode interconnect electrically communicated with an adjacent cathode of another fuel cell, so as to provide operation as desired.

Turning to FIG. 5, a further cross section through a wire interconnect member in accordance with the present invention is illustrated, and shows wires 12' having a hexagonal shape and being bonded to separator plate 10 in an offset-row grid as illustrated. Of course, and as set forth above, wires 12, 12' can be provided having any of a wide variety of shapes, positions, configurations and the like in accordance with the present invention.

Wires 12 in accordance with the present invention can advantageously be provided having a length greater than about 0.125 mm (0.005") and preferably between about 0.5 mm (0.020") and about 10 mm (0.40"), more preferably between about 1 mm (0.04") and about 4 mm (0.16").

Wires with diameter of less than 2.5 mm (0.10"), depending on the CTE and elastic modulus of the wire material, are preferred. More preferably the wire diameter is less than about 1.25 mm (0.05"), and most preferably less than about 0.75 mm (0.03").

Within these parameters the individual wire diameter may preferably be between about 0.025 mm (0.001") and about 2 mm (0.08"), more preferably between about 0.125 mm (0.005") and about 1 mm (0.04").

The number and diameter of wires positioned between separator plate 10 and the electrode is advantageously selected such that cumulative wire cross-sectional area constitutes between about 0.5% and about 75%, preferably between about 1% and about 40%, of the total area of the electrode. Further, the interconnect is preferably substantially uniformly distributed over the electrode. Providing the interconnect as wires, woven or non-woven, or other segmented bonded portions such as expanded metals or alloys, felt, foam, mesh or etched structure, serves to further reduce strains at the interconnect—electrode interface as desired.

The wires for a cathode-side wire-brush interconnect are advantageously fabricated from materials preferably selected from a group of materials having sufficient long-term oxidation resistance at the stack operating temperatures and oxide scale electron conductance. Typically such materials include stainless steels and super-alloys preferably selected from the group consisting of chromia-forming Ni—Cr—, Ni—Cr—Fe—, Fe—Cr—, Fe—Cr—Ni and Co-based alloys as well as Cr-based alloys, noble metals/alloys and mixtures thereof. Examples of suitable super-alloys include HAYNES® alloy 230, HAYNES® alloy 230-W, and Hastelloy® X, which have been found suitable in the present invention. Other wire materials include composites of metals and ceramics containing any of the above mentioned metals and alloys.

Wires 12 can advantageously be provided having a cross sectional shape that is round (FIG. 4), square, hexagonal (FIG. 5), oval or having other desirable shapes from a cost and manufacturing point of view. It should also be appreciated that the wires may be of uniform cross section or of varying cross section, and that the wires may be positioned perpendicular to the separator plate, or at an angle, or curved, or in other desirable positioning.

Wires 12 may be straight, bent in a random or periodic manner, or positioned in other desirable orientations.

It should also be appreciated that the wires may be of one cross section at one end and of another cross section at the other end.

It should be appreciated that wires to be used as either cathode interconnect or anode interconnect in accordance with the present invention could also be provided in the form of single wires emanating from a mesh bed which can be bonded, completely or selectively, to the separator plate for contact or electrical communication with the electrode. Alternatively, such a configuration could also be provided having single wires emanating from a mesh bed that is bonded completely or selectively to the electrode for contact or electrical communication with the separator plate. In another alternative embodiment the wires may not be bonded at all and are simply either in contact or in electrical communication with either the electrode and/or separator plate.

A further alternative is to provide a deformed mesh which can be bonded, completely or selectively, to one or both of the separator plate and the electrode, wherein dimples in the material define extending portions for contacting the adjacent members.

In accordance with a still further embodiment of the present invention, it may be desired to provide a plurality of wires in electrical communication between the separator and an adjacent electrode as described above, with some or all of the wires in a central portion of the wire configuration or array being deformed so as to provide an expansion/compliancy arrest or loop, and such a configuration can be provided either as individual wires or as a portion of a central mesh configuration with similar compliancy, for example wherein wires emanate from both sides to contact the separator and electrode respectively.

FIG. 1 shows wires 12 positioned in a substantially square array. It should of course be appreciated that the wires may be positioned in a different array, for example circular, hexagonal or the like, and/or with aligned or offset rows and columns. In this regard, the interconnect and separator plate as whole may be square, rectangular, circular, oval, triangular, hexagonal, rhomboid, polygonal, or other such geometry, or even irregular shaped geometry.

It should also be appreciated that the material, shape, patterns, or other features may be of one kind in one region and of another kind in another region of the interconnect.

The wires positioned between components as described above also serve a support aspect in connection with the fuel cell stack, in that such wires must support the weight of the stack itself. Thus, the wires are preferably selected of a material, and positioned in a configuration, which is sufficient to safely support the weight of the stack.

In accordance with an alternative embodiment of the present invention, the electrical connection without conveying stress provided in accordance with the present invention can be provided utilizing structures other than wires, for example in the form of a foam-type material positioned between the components, or a shape imposed on one or the other, or both, of the components integrally, such as by etching, and the like.

It should also be appreciated that the interconnect structure provided in accordance with the present invention can be manufactured through various additive or subtractive processes, for example by brazing, etching, welding, or growth such as through vapor deposition, or through surface modification or mechanical, pressure, press fitting or fusion bonding.

One way to fabricate the wire-brush interconnect of the present invention is to cover the surface of the separator plate with brazing powder, then place a perforated ceramic plate, with the perforations matching the desired spacing and diameter of the wire stubs, on the plate, then placing the wire stubs into the perforations (this could be a robotic-controlled process), and brazing the structure in a high vacuum furnace. By brazing the oxidation resistant wires to a CTE matched metallic sheet, i.e., ferritic stainless steel and, in particular E-BRITE, the behavior of the stack is controlled by the properties of the separator plate and the cell, and this structure leads to robust planar SOFC stacks that can be thermal cycled without fracture at the bonded interface. This design frees the stack design from CTE mismatch issues and a rather large set of high-temperature oxidation resistant alloys with electronically conducting scales are potential candidate materials for the wires. The CTE of the wire material therefore becomes irrelevant and lifetime and cost issues control the stack design.

It should also be noted that although FIG. 2 illustrates cathode interconnect 30 positioned between separator plate 10 and cathode 28, a similar structure can advantageously be positioned between the separator plate 10 and anode 24, if desired.

On the anode or fuel side, it may be desirable to provide the interconnect material from nickel in a wire configuration or in a mesh, felt, or foam configuration, so as to provide desired properties in the fuel side environment of use, and enable less expensive material to be used.

The above invention describes the wire-brush interconnect structures for a planar SOFC stack to mitigate thermal stresses arising from CTE mismatch and enable the use of any alloy with sufficient oxidation resistance and electron conducting scale. The separator plates are made of metallic materials that have thermal behavior similar to the planar solid oxide fuel cell so as not to complicate the sealing and manifolding required for the control of gas flow streams at the cell and stack levels. The materials that could be used for the separator plate include stainless steels, particularly ferritic and super-ferritic grades, Cr-based alloys, super-alloys and combinations thereof.

It should be noted that although the present description is provided in terms of bonding the interconnect to an adjacent electrode, various types of configurations are possible within the broad scope of the invention so long as contact, more particularly electrical communication, is provided. The anode and cathode interconnects may be bonded to, contacting, or otherwise in electrical communication with the adjacent electrode. This applies equally to the connection between interconnect and separator plate, which can also be bonded, or otherwise positioned in contacting or electrical communication relationship.

The following Examples demonstrate advantageous characteristics of the interconnect of the present invention.

EXAMPLES

Example 1

Samples of separator material, approximately 25 mm (1") square, were cut from a ferritic stainless steel, sheet alloy (E-BRITE®) and coated with a Ni-based braze alloy (NICROBRAZE® 150) powder. The sheet sample was set-up beneath a jig which utilized a multi-hole ceramic block to position multiple short lengths of a super-alloy wire in contact with, and orthogonal to, the sheet. The assembly was placed in a high temperature, vacuum-brazing furnace and, via a ramped heat-treatment cycle, the wires were brazed to the separator sheet at approximately 1100° C. The super-alloy materials used in wire form, were HAYNES® alloy 230 or 230W, in various diameters including 0.25 mm (0.010"), 0.375 mm (0.015"), 0.75 mm (0.030") and 0.875 mm (0.035"). The brazed wire-sheet assemblies, of a given wire diameter, were cropped parallel to the separator plate to produce brush-like components having a nominal wire length of approximately 3 mm (0.12").

A paste of strontium-doped lanthanum manganite (LSM) powder and binder was applied to one surface of a 25 mm (1") square sheet of sintered LSM cathode, which had been ultrasonically cleaned in acetone and dried. The 25 mm square brush component was pressed into the paste and the assembly fired at 950° C. in air. The bonded wire-brush-cathode assembly was then thermally cycled to evaluate the robustness of the interconnector-cathode interface to fluctuating thermal strains that could be experienced in service. Several different wire diameters, in such wire-brush-cathode assemblies, were evaluated in this manner.

The thermal cycling test involved heating the assembly in air at 5° C./min to 800° C., holding for 30 minutes and then cooling at 5° C./minute down to about 100° C., and then repeating the cycle. Wire-brush-cathode assemblies using 0.875 mm (0.035") and 0.25 mm (0.010") diameter wire were still bonded well after 20 thermal cycles, at which point, the bonds were intentionally broken for metallographic study.

Example 2

The experiments of Example 1 were repeated using a 50/50 volume percentage of LSM and strontium-doped lanthanum cobalt-doped ferrite (LSCF), respectively. In addition to HAYNES® alloy 230 or 230W, a FeCrAlY wire (KANTHAL® A) was also evaluated. After 10 thermal cycles, the 0.5 mm (0.020") FeCrAlY wire bond failed. After approximately 40 cycles, the 0.875 mm (0.035") diameter HAYNES® alloy 230-W wire bonded samples failed. The 0.25 mm (0.010") diameter HAYNES® alloy 230-W wire bonded samples did not fail even after 100 thermal cycles.

Example 3

Similar test specimens were prepared for the anode interconnector by brazing Ni foam to E-BRITE® sheet. Various grades of Ni foam (manufactured as INCOFOAM®) including pore densities ranging from approximately 90 pores per inch (ppi) to 20 ppi, metal-loading densities ranging from approximately 500 to 5000 g/m$^2$ and thicknesses ranging from approximately 1 to 5 mm were evaluated. The foams were bonded to typical anode material (NiO-YSZ), using a paste of NiO in a binder, and fired under reducing conditions at 950° C. All samples formed tenacious Ni bonds with significant thermal cycling capability.

Example 4

Following the establishment of excellent thermal cycling capability, the invention interconnector was scaled-up in size. Significantly larger wire-brush and foam interconnect end plates of the present invention were produced in similar manner and assembled with a solid oxide fuel cell in between to form a 1-cell module. The fuel cell module having the wire-brush interconnector of the present invention was run successfully under 25 A current load at the nominal temperature of 700° C. for approximately 1,000 hours and successfully underwent one thermal cycle without any ill effects.

It should be appreciated that the present invention has provided for advantageous electrical connection between adjacent components within a fuel cell stack while insulating the adjacent components from stresses due to mismatch of thermal expansion coefficients of the components, thereby allowing the interconnect material to be selected based upon oxidation resistance and oxide electron conductivity. This allows for enhanced lifetime of the fuel cell stack during thermal cycling, which is desired and advantageous in accordance with the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A fuel cell stack, comprising:
   a plurality of fuel cells each having an anode layer, an electrolyte layer, and a cathode layer, said fuel cells each having a first effective thermal expansion coefficient;
   a plurality of bipolar plates positioned between adjacent fuel cells having an anode interconnect, a separator plate, and a cathode interconnect, said bipolar plates being positioned between adjacent fuel cells, wherein said anode interconnect is in electrical communication with said anode layer of one adjacent fuel cell, wherein said cathode interconnect is in electrical communication with said cathode layer of another adjacent fuel cell, and wherein at least one interconnect of said cathode interconnect and said anode interconnect has a second effective thermal expansion coefficient and is adapted to reduce strain between said at least one interconnect and an adjacent fuel cell due to differences between said first and second thermal expansion coefficients over repeated thermal cycles, wherein said at least one interconnect comprises a plurality of wires which are substantially perpendicular with respect to the separator plate.

2. The apparatus of claim 1, wherein said first thermal expansion coefficient is different from said second thermal expansion coefficient.

3. The apparatus of claim 1, wherein said wires have a diameter of less than about 2.5 mm (0.10").

4. The apparatus of claim 1, wherein said wires have a diameter of less than about 1.25 mm (0.05").

5. The apparatus of claim 1, wherein said wires have a diameter of less than about 0.75 mm (0.03").

6. The apparatus of claim 1, wherein said wires have a length greater than about 0.125 mm (0.005").

7. The apparatus of claim 1, wherein said wires have a length of between about 2.5 mm (0.10") and about 10 mm (0.40").

8. The apparatus of claim 1, wherein said wires have a length of between about 1 mm (0.04") and about 4 mm (0.16").

9. The apparatus of claim 1, wherein said at least one interconnect comprises said cathode interconnect.

10. The apparatus of claim 1, wherein said at least one interconnect has an interconnect cross-sectional area and said adjacent electrode has a cross-sectional area, and wherein said interconnect cross-sectional area constitutes between about 0.5% and about 75% of said cross-sectional area of said adjacent electrode.

11. The apparatus of claim 10, wherein said at least one interconnect is substantially uniformly distributed over said adjacent electrode.

12. The apparatus of claim 1, wherein said at least one interconnect has an interconnect cross-sectional area and said adjacent electrode has a cross-sectional area, and wherein said interconnect cross-sectional area constitutes between about 1% and about 40% of said cross-sectional area of said adjacent electrode.

13. The apparatus of claim 12, wherein said at least one interconnect is substantially uniformly distributed over said adjacent electrode.

14. The apparatus of claim 1, wherein said cathode interconnect and said anode interconnect are adapted to substantially eliminate effects due to differences between the first and second thermal expansion coefficients over repeated thermal cycles.

15. The apparatus of claim 1, wherein both said cathode interconnect and said anode interconnect are adapted to substantially eliminate effects due to differences between the first and second thermal expansion coefficients over repeated thermal cycles.

16. The apparatus of claim 1, wherein said plurality of fuel cells are substantially planar fuel cells.

17. The apparatus of claim 1, further comprising a pair of end plates positioned on opposite ends of said fuel cell stack.

18. The apparatus of claim 1, wherein said cathode interconnect comprises an oxidation resistant alloy.

19. The apparatus of claim 1, wherein said cathode interconnect comprises a material selected from the group consisting of chromia-forming Ni—Cr—, Fe—, Fe—Cr—, Fe—Cr—Ni— and Co-based alloys, Cr-based alloys, noble metals/alloys and combinations thereof.

20. The apparatus of claim 1, wherein said anode interconnect comprises nickel.

21. The apparatus of claim 20, wherein said anode interconnect is provided in a form selected from the group consisting of expanded metals, expanded alloys, felt, foam, mesh and combinations thereof.

22. The apparatus of claim 1, wherein said at least one interconnect has a total area bonded to said adjacent fuel cell, and wherein said total bonded area comprises a plurality of discrete bonded portions bonded to said adjacent fuel cell.

23. A bipolar plate for a fuel cell stack, comprising:
   a separator plate having a first side and a second side;
   an anode interconnect in electrical communication with the separator plate and adapted for electrical communication with an anode layer of a first fuel cell; and
   a cathode interconnect in electrical communication with the separator plate and comprising a plurality of discrete portions adapted for electrical communication with a cathode layer of a second fuel cell, wherein said plurality of discrete portions comprises wires positioned substantially perpendicular with respect to the separator plate.

24. The apparatus of claim 23, wherein said wires have a diameter of less than about 2.5 mm (0.10").

25. The apparatus of claim 23, wherein said wires have a diameter of less than about 1.25 mm (0.05").

26. The apparatus of claim 23, wherein said wires have a diameter of less than about 0.75 mm (0.03").

27. The apparatus of claim 23, wherein said wires have a length greater than about 0.125 mm (0.005").

28. The apparatus of claim 23, wherein said wires have a length of between about 2.5 mm (0.10") and about 10 mm (0.40").

29. The apparatus of claim 23, wherein said wires have a length of between about 1 mm (0.04") and about 4 mm (0.16").

30. The apparatus of claim 23, wherein said cathode interconnect is permeable to gas.

31. The apparatus of claim 23, wherein said cathode interconnect comprises an oxidation resistant alloy.

32. The apparatus of claim 23, wherein said cathode interconnect comprises a material selected from the group consisting of chromia-forming Ni—Cr—, Fe—, Fe—Cr—, Fe—Cr—Ni— and Co-based alloys, Cr-based alloys, noble metals/alloys and combinations thereof.

33. The apparatus of claim 23, wherein said anode interconnect comprises a plurality of discrete portions adapted for electrical communication with an anode layer of said first fuel cell.

34. The apparatus of claim 33, wherein said anode interconnect comprises nickel.

35. The apparatus of claim 33, wherein said anode interconnect is provided in a form selected from the group consisting of felt, foam, mesh and combinations thereof.

36. A wire brush interconnect for a fuel cell stack, comprising:

a separator plate having a first side and a second side; and at least one interconnect in electrical communication with said separator plate and comprising a plurality of discrete portions adapted for electrical communication with an electrode of a fuel cell, wherein said plurality of discrete portions are a plurality of wires which are substantially perpendicular to the separator plate.

* * * * *